United States Patent [19]

Fowler

[11] 3,900,146

[45] Aug. 19, 1975

[54] METHOD AND APPARATUS FOR LAYING PIPELINES

[75] Inventor: Oliver W. Fowler, Houston, Tex.

[73] Assignee: Brown & Root, Inc., Houston, Tex.

[22] Filed: Nov. 21, 1973

[21] Appl. No.: 417,720

[52] U.S. Cl. .................... 228/103; 29/429; 29/431; 61/72.5; 228/155; 228/182; 228/231; 228/232; 228/5.1; 228/6

[51] Int. Cl.² ............ B23K 31/02; B21D 39/02; F16L 1/00

[58] Field of Search ............. 29/475, 488, 497, 431, 29/429; 61/72.1, 72.2, 72.6

[56] References Cited
UNITED STATES PATENTS
3,744,259   7/1973   Wagley ............................ 61/72.6 X Primary Examiner—Al Lawrence Smith
Assistant Examiner—Margaret M. Joyce
Attorney, Agent, or Firm—Burns, Doane, Swecker & Mathis

[57] ABSTRACT

A method and apparatus for fabricating a pipeline from pipe segments and laying the pipeline upon a ground surface.

The apparatus includes a plurality of longitudinally extending thermally insulated chambers which are connected end-to-end to form an articulated train. The individual thermally insulated chambers are connected by thermally insulated sleeves so as to provide continuous communication between adjacent ones of the insulated chambers while permitting articulated movement of the chambers. Means are provided within the articulated train for forming tubular sections end-to-end into a pipeline. Propelling means are provided to advance the articulated train from longitudinal support beneath the formed pipeline to lay the pipeline upon the ground surface. A system is also provided to control the temperature within the interior of the articulated train of thermally insulated chambers.

The method includes the steps of maintaining a preselected temperature range within the interior of an articulated train of thermally insulated chambers and supporting at least a portion of an elongate tubular member within the enclosed articulated train. Tubular sections are connected within the enclosed train end-to-end to form a continuous elongate conduit. The final step entails advancing the articulated train from beneath supporting engagement with the tubular conduit to position the pipeline upon the underlying ground surface.

16 Claims, 6 Drawing Figures

PATENTED AUG 19 1975

METHOD AND APPARATUS FOR LAYING PIPELINES

BACKGROUND OF THE INVENTION

This invention relates to a method and apparatus for laying pipelines. More particularly, the invention pertains to forming a continuous pipeline from pipe segments and laying the pipeline upon a ground surface in a hostile working environment such as exists, for example, in the Arctic regions of the United States and Canada.

Rapidly burgeoning requirements for sources of power, coupled with increasing uncertainty of overseas supplies, have accelerated activities in connection with the discovery and production of oil and natural gas in the frontier areas of North America. This activity bore fruit with the discovery of oil at Prudhoe Bay on the Alaskan North Slope in 1968. Moreover, studies have indicated that potential recoverable resources in the Arctic sedimentary basin of Canada may prove to be 60 billion barrels of crude oil and 350 trillion cubic feet of raw natural gas.

With the foregoing discovery and successful production of oil above the Arctic circle a problem has arisen in connection with a reliable and economical means for transporting the crude oil and/or natural gas to consumer markets in the United States and Canada. In this connection, while various techniques have been at least theorized, including an air lift, the most economical and reliable system envisioned to date entails the construction of permanent overland pipelines. Construction of such pipelines, however, which may be 30 to 48 inches in diameter, presents unique and challenging problems to the pipeline construction industry.

More specifically, envisioned problems stem primarily from an extremely hostile working environment which exists in the Arctic and Subartic regions. As a threshold reality, the industry must contend with geographical remoteness and an extremely rugged terrain. Even greater problems, however, are found in the peculiar weather conditions prevalent in the Arctic and Subartic areas. In this connection, ambient temperature during winter months may be as low as −60° F. with wind velocities of 50 miles an hour or more. Not only is the extreme cold a limiting factor for both men and machines but the lack of daylight hours, coupled with communication, supply and quality control problems render continuous outdoor work impossible during the winter months of November 15 through March 15.

An apparent solution to the rigors of laying pipeline during winter months might be to work only during the summer months of June through September, when temperatures may sore to as high as 90° F. or more. This readily apparent solution, however, is only illusory due to the unique statigraphy of the Arctic and Subarctic region.

More particularly, the land mass of the Arctic circle in cross section typically comprises a first layer of 2 to 4 inches in depth composed of organic material called tundra. The tundra serves as an insulation material for permanently frozen earth below known as permafrost. An active layer of 1 to 2 feet or more exists between the tundra and permafrost and freezes and thaws each year. The uppermost tundra insulation mat controls the thickness of this active layer.

Accordingly, during the summer months the active layer thaws and becomes mushy and incapable of supporting conventional pipelaying equipment. Therefore it becomes impossible to lay a pipe with heavy equipment unless the active layer is frozen.

In sum, the pipeline construction industry is faced with two mutually exclusive and collectively exhaustive environmental dilemmas. The winter is too cold and the daylight hours are too short to lay pipelines, while in the summer the ground is too soft to support pipeline equipment.

OBJECTS AND SUMMARY OF THE INVENTION

It is therefore a general object of the invention to provide a novel method and apparatus for constructing and laying pipelines in the Arctic which will obviate or minimize problems of the type previously described.

It is a particular object of the invention to provide a novel method and apparatus for constructing and laying pipelines in arctic regions during winter months when the active layer is frozen.

It is another object of the invention to provide a novel method and apparatus for constructing and laying pipelines in arctic regions wherein personnel and pipe handling equipment may be insulated from the extreme low temperatures prevalent during arctic winters.

It is yet another object of the invention to provide a novel method and apparatus for constructing and laying pipeline during arctic winter months wherein laying operations may be conducted 24 hours a day and independent of natural light.

It is still another object of the invention to provide a novel method and apparatus for constructing and laying pipelines in the Arctic wherein bending stresses on the pipeline due to an undulating and rugged terrain may be minimized.

It is a further object of the invention to provide a novel method and apparatus for constructing and laying pipelines in the Arctic wherein a systematic and uniform operation is facilitated with resultant high quality control.

It is yet a further object of the invention to provide a novel method and apparatus for constructing and laying pipelines in arctic regions wherein communications are facilitated along the pipeline as it is being constructed and laid.

It is still further an object of the invention to provide a novel method and apparatus for constructing and laying pipelines in arctic regions wherein axial control of pipeline is facilitated while laying the line over an undulating terrain.

It is yet still a further object of the invention to provide a novel apparatus for constructing and laying pipelines in arctic regions which is highly rugged in design while being readily serviceable so that substantially continuous pipelaying operations may be performed.

BRIEF SUMMARY

At least one method and apparatus operable for forming a continuous pipeline from pipe segments and laying the pipeline upon a ground surface in the Arctic intended to accomplish at least some of the foregoing objects includes a plurality of longitudinally extending thermally insulated chambers which are connected end-to-end to form an articulated train. The individual thermally insulated chambers are connected by thermally insulated sleeves so as to provide continuous communication between adjacent ones of the insulated chambers while permitting articulated movement of the chambers. Means are provided within the articulated train for forming tubular sections ene-to-end into a pipeline. Propelling means are provided to advance the articulated train from longitudinal support beneath the formed pipeline to lay the pipeline upon the ground surface. A system is also provided to control the temperature within the interior of the articulated train of thermally insulated chambers.

The method includes the steps of maintaining a preselected temperature range within the interior of an articulated train of thermally insulated chambers and supporting at least a portion of an elongate tubular member within the enclosed articulated train. Tubular sections are connected within the enclosed train end-to-end to form a continuous elongate conduit. The final step entails advancing the articulated train from beneath supporting engagement with the tubular conduit to position the pipeline upon the underlying ground surface.

THE DRAWINGS

While the present invention is particularly pointed out and distinctly claimed in the concluding portion of the specification, a preferred embodiment is discussed in the following detailed description which may best be understood when read in connection with the accompanying drawings, in which:

FIG. 1 is a schematic side elevational view of an articulated train of thermally insulated chambers riding upon an undulating terrain and designed to receive pipe segments and construct the segments into a pipeline to be laid upon the underlying terrain;

FIG. 2, note sheet 2, is a schematic plan view of the articulated train disclosed in FIG. 1 and illustrates the capability of the articulated train to conform to lateral bends and curves of the terrain;

FIG. 3, note sheet 1, discloses a detailed cross sectional view of a self-propelled insulated chamber including an overhead laterally mounted traversing hoist assembly;

FIG. 4 discloses a detailed cross sectional view of a further insulated chamber including a pipe roller cradle which is vertically and horizontally adjustable within the insulated chamber;

FIG. 5 is a cross sectional detailed view of a universal connecting assembly and an enclosing insulated sleeve which serves to unify the ends of the individual insulated chambers; and FIG. 6 is a cross sectional view taken along section line 6—6 in FIG. 5.

DETAILED DESCRIPTION

Figure 1:
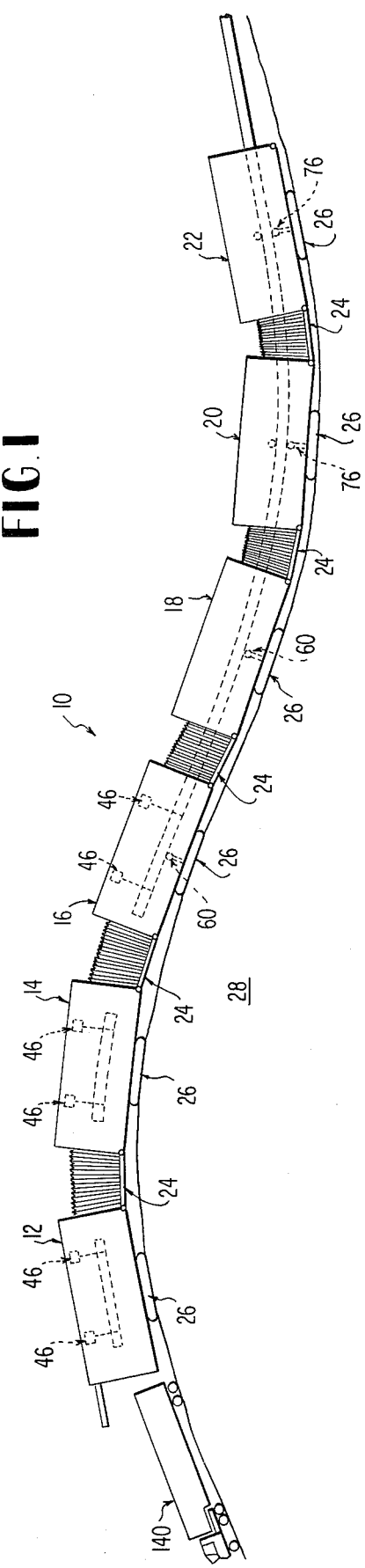
Figure 2:
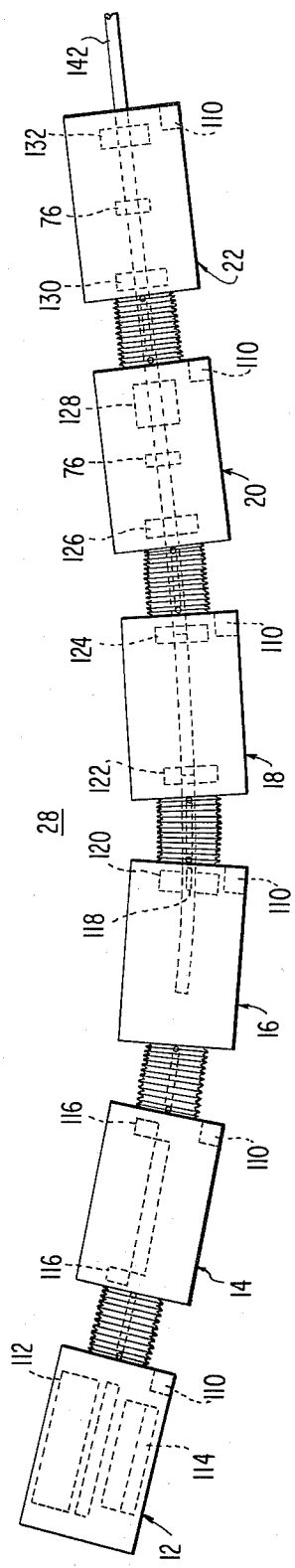

Referring now to the drawings, and particularly to FIGS. 1 and 2 thereof, there will be seen schematic views of an apparatus for fabricating and laying a pipeline upon an undulating arctic terrain.

More specifically the pipelaying apparatus 10 comprises a plurality of longitudinally extending chambers or wagons 12, 14, 16, 18, 20 and 22. The chambers are connected end-to-end by a plurality of universal coupling assemblies 24. Each of the chambers is supported by an underlying endless track motive assembly 26 which serves to drive the train over the arctic terrain 28.

Figure 3:
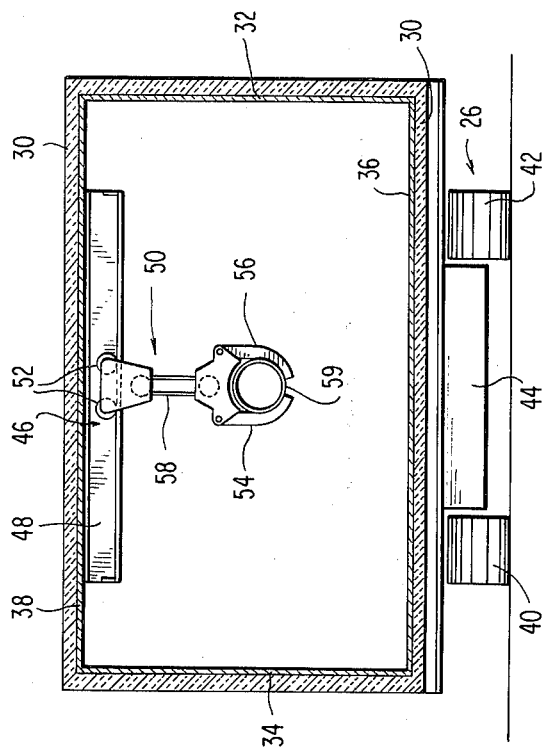

The wagons or longitudinally extending chambers are preferably rectangular in cross section, note FIG. 3, and include side walls 32 and 34, a continuous floor 36 and a ceiling 38.

The longitudinal extent of the floor, ceiling and side panels are covered, either interiorly or exteriorly, with a layer of polyurethane foam sufficient in depth to provide a desirable temperature insulation for the interior of each unit.

As previously mentioned each unit is carried by a self-propelled endless track motive assembly 26. Each motive assembly includes a pair of endless treads 40 and 42, note FIG. 3, and an intermediate driving source 44.

A hydraulic jack, not shown, is preferably positioned at each of the four corners of the floor panel 36. Therefore, in the event of mechanical failure of any one of the motive assemblies 26, the affected chamber may be rapidly raised and the motive source 26 may be readily withdrawn and a replacement substituted with a minimum amount of pipelaying down time. The damaged motive unit may then be taken to a remote repair facility for servicing and reconditioning.

Thermally insulated chambers 12, 14 and 16 are each provided with a pair of overhead pipe supporting hoist assemblies 46. Each of these assemblies includes a longitudinally extending rail 48 connected to the ceiling 38 of the wagon. A clamshell hoist 50 is mounted upon the rail 48 and preferably is electrically driven and may translate back and forth upon rollers 52. The clamshell halves 54 and 56 are remotely operably controllable and may be raised and lowered by the provision of the pulley assembly 58.

From the foregoing description of the overhead crane assembly 46 it will be appreciated that a pipeline segment 59 carried at each end by a hoist assembly may be laterally and vertically controlled or oriented within each of the chambers 12, 14 and 16.

In addition to the overhead crane assemblies 46 within chamber 16, there is provided an underlying vertically and horizontally adjustable pipe roller cradle 60 to further support the pipe segments. Moreover, elongated thermally insulated chamber 18 may also be provided with a similar roller cradle 60.

Figure 4:
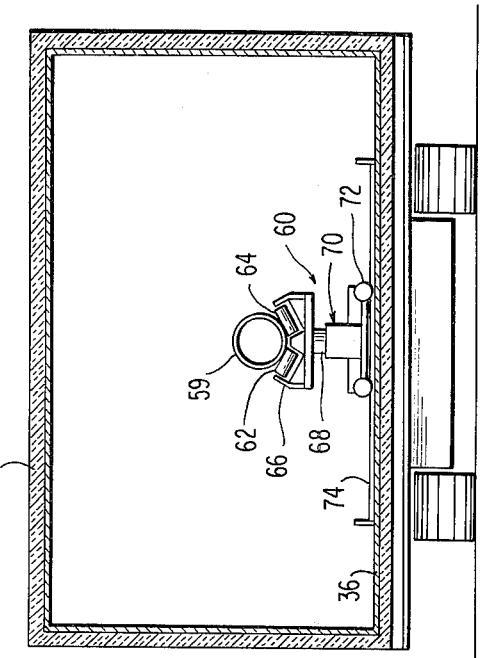

With reference now to FIG. 4 there will be seen a detailed view of a roller cradle 60 according to a preferred embodiment of the invention. More particularly, the roller cradle includes a pair of inclined roller assemblies 62 and 64 which are mounted upon a bearing frame 66 which in turn is carried by a vertically adjustable column 68 of a piston and cylinder assembly 70. The piston and cylinder assembly 70 in turn is mounted upon a roller underframe 72 which rides upon transversely extending tracks 74, directly connected to the floor 36 of the insulated chamber.

It will be appreciated from the foregoing description of the roller cradle assembly that a pipe segment 59 may be supported for vertical and horizontal movement within the interior of the insulated chamber.

The last two chambers 20 and 22 are each internally fitted with a hydraulic roller or track assembly 76 of the type suitable to control axial movement of the pipeline relative to the articulated train 10. For a more detailed disclosure of an axial control assembly of the type operable with the subject invention reference may be had to Lawrence U.S. Pat. Nos. 3,390,532 and 3,487,648. The disclosure of these Lawrence patents are hereby incorporated by reference as though set forth at length.

As previously noted the longitudinally extending thermally insulated chambers are interconnected end-to-end into a train by a plurality of universal connecting assemblies 24.

Figure 6:
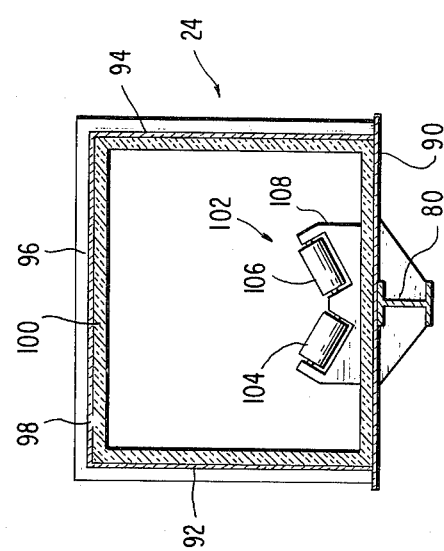
Figure 5:
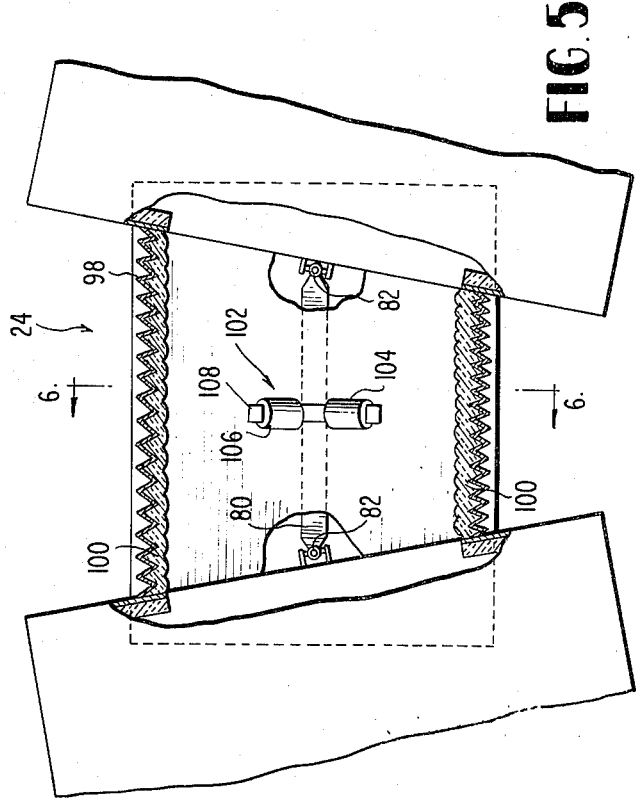

With reference now to FIGS. 5 and 6, it will be seen that each connecting assembly 24 includes an I-beam bridge 80 which is mounted at each end to an adjacent chamber by a universal coupling 82.

The connecting assemblies 24 are each preferably fashioned with an underlying generally rectangular floor 90 which is mounted directly upon the I-beam 80. The connecting assembly 24 is enclosed on the sides 92 and 94 thereof and the ceiling 96 preferably by the provision of a flexible accordion structure 98. The accordion structure 98 and the floor 90 are covered on the interior or exterior, as desired, with a flexible polyurethane insulation layer 100.

Thus it will be seen that the individual longitudinally extending thermally insulated chambers are interconnected for universal relative movement and a common passage is formed throughout the longitudinal extent of the train by the provision of the universal connecting assemblies 24.

In order to assist in conveying the pipe segments 59 and the pipeline through the interior of the train 10, each connecting assembly 24 is provided with a pipe cradle roller assembly 102. More particularly a pair of inclined opposing rollers 104 and 106 are mounted upon a bracket 108 which in turn is carried by I-beam 80. The bracket 108 may be fixedly mounted, as shown in FIG. 6, or vertically adjustable by the provision of an underlying piston and cylinder assembly, such as assembly 70 shown in FIG. 4.

With specific reference now to FIG. 2, each of the thermally insulated chambers 12-22 may be provided with an environmental control unit 110 which includes a conventional motor generator unit and an electrical heating unit. The electricity generated by each generating unit is designed to be sufficient to heat the associated chamber, provide power for a lighting system and also operate pipelaying equipment positioned within the chamber.

In this connection, the chamber 12 is fashioned with a pipe storage rack 112 and a conventional pipe bending machine 114.

Chamber 14 is provided at each of the ends thereof with a pipe beveling machine 116.

Chamber 16 includes an internal pipe clamp assembly 118 and an automatic hot pass pipe welding machine 120 of the type manufactured by the CRC-Crose International, Inc., a corporation of Oklahoma.

The chamber 18 is provided with a first automatic pipe welding machine 122 and a second automatic pipe welding machine 124 of the type designed to fill in the circumferential bevel about the pipe joints.

A still further automatic pipe welding machine 126 is provided in chamber 20 to cap the beveled area and complete the welding union of the individual pipeline segments 50. The chamber 20 is also provided with a hydraulic axis control 76 as previously discussed. Still further the chamber 20 is provided with a post heating chamber 128 to relieve stresses in the welded junction of the pipe segments.

The final chamber 22 is provided with an X-ray machine 130 to inspect the welding integrity of the pipe segments, a dynamic pipe control unit 76 and a bituminous coating and wrapping machine 132.

MODE OF OPERATION

In fabricating and laying pipeline according to a preferred embodiment of the invention utilizing the previously discussed apparatus, a heated pipe supply wagon 140 backs up to chamber 12 and loads pipe segments 59 which have been preheated, relative to ambient temperature, to 40° or 50° F. The heated pipe segments are then transferred into the initial chamber 12 of the articulated pipeline construction and laying train 10 and stacked upon storage rack 112.

During the periods when outside work can be performed with light vehicles, such as March 15 through November 15, the terrain of the pipelaying route is surveyed and plotted. This information is now utilized to bend pipe segments 59 utilizing the bending machine 114 to conform to the underlying arctic terrain. Of course it will be appreciated that the bending operation within chamber 12 is in accordance with the ground surface underlying the free end 142 of the pipeline being fabricated. By the provision of this bending operation, structural stresses are minimized within the pipeline when it is laid upon the ground surface.

The bent pipe segment 59 is then transferred from chamber 12 into chamber 14 where the ends are beveled by pipe beveling machines 116 suitable to facilitate a subsequent abutment welding process.

The shaped and beveled pipe segments 59 are then transferred into the chamber 16 where they are aligned with the utilization of an internal line up clamp and in some instances a reach rod (not shown). Once aligned a first continuous automatic hot post weldment is applied to the junction by a continuous automatic weld machine 120.

The articulated train 110 is advanced so that the chamber 18 next surrounds the pipe segment 59 where a first and second filler weld is added by automatic pipe welding machines 122 and 124.

The train is further advanced so that chamber 20 surrounds the pipe segment 59 where a final filler or cap weld is applied by automatic pipe welding machine 126.

Axial control of the pipeline 142 thus forming is provided by the hydraulic unit 76 within the chambers 20 and 22, as previously discussed. This axial control is particularly desirable when traversing undulating sloping terrain.

Following the final filler weld, the pipeline passes through a post heat stress relieving chamber 128 and into an X-ray unit 130 in the final chamber 22. The X-ray unit inspects the integrity of the junction weldments.

The final step entails coating the pipeline with a bituminous coating and wrapping the bituminous coat before the pipeline 142 exits from the articulated train to descend by gravity onto the underlying ground surface.

In order to coordinate and control the entire pipelying operation, a common communication system may be strung throughout the articulated train.

SUMMARY OF THE MAJOR ADVANTAGES

In describing the invention various advantageous aspects have been specifically and inherently delineated.

A principal advantage of the invention resides in the provision of a novel method and apparatus suitable to permit the fabrication and laying of a pipeline upon a rugged arctic terrain.

The individual pipe segments are bent to conform to the underlying terrain so that placement upon the underlying ground surface will not impose structural stresses upon the pipeline.

The enclosed articulated train permits the continuous laying of pipe segments during winter months without relying upon natural light and in an environment insulated from the extremely low temperatures and windy conditions of the Arctic.

The individual insulated chambers ride upon endless track units which are readily removable so as to be replaceable and thus minimize downtime of the pipelaying train. Further, axial control of the pipeline over a sloping terrain is provided and communications between the various work stations along the pipeline spread is materially facilitated.

The subject novel method and apparatus has been specifically designed for use in the Arctic. It will be appreciated, however, that the subject invention may find application in other geographical areas where environmental control would be either necessary or desirable such as, for example, a desert. Of course in this instance the heating units would be replaced with cooling units.

While the invention has been described with reference to preferred embodiments, it will be appreciated by those skilled in the art that additions, deletions, modifications and substitutions or other changes not specifically described may be made which will fall within the purview of the appended claims.

What is claimed is:

1. An apparatus for fabricating a continuous elongate tubular member and for laying said member upon a ground surface comprising:
 a plurality of longitudinally extending chambers;
 means connected to each of said chambers to thermally insulate said chambers;
 means for connecting said plurality of insulated chambers together end-to-end to form an articulated train of thermally insulated chambers;
 means for providing enclosed thermally insulated longitudinal communication between adjacent ones of said insulated chambers while simultaneously permitting articulated movement between adjacent ones of said insulated chambers;
 means positioned within said articulated train of chambers for forming tubular sections end-to-end into a continuous elongate tubular member;
 means for supporting the tubular sections and at least a portion of the continuous elongate member fabricated therefrom for longitudinal movement with respect to said articulated train, said supporting means comprising
  a plurality of laterally traveling hoists mounted within at least some of said longitudinally extending insulated chambers, and
  normally extending cradle rollers connected with each of said means for connecting said plurality of insulated chambers;
 means for propelling said articulated train of thermally insulated chambers along a desired underlying ground surface for advancing said articulated train from longitudinal support beneath the continuous elongate member and thus laying the continuous elongate member upon the ground surface; and
 means for controlling the temperature within the interior of said articulated train of thermally insulated chambers.

2. An apparatus for fabricating a continuous elongate tubular member and for laying said member upon a ground surface as defined in claim 1 wherein said means for forming comprises:
 bending means positioned within at least one of said longitudinally extending thermally insulated chambers for bending tubular conduit sections into general conformity with the topography of the ground surface underlying at least a portion of said articulated train.

3. An apparatus for fabricating a continuous elongate tubular member and for laying said member upon a ground surface as defined in claim 2 wherein said means for forming further comprises:
 means positioned within said articulated train downstream of said bending means for aligning one end of a tubular section and the free end of the continuous elongate member prior to connecting said tubular section to the free end of the continuous elongate member; and
 means positioned within said articulated train for welding one end of the aligned tubular section onto the free end of the continuous elongate member.

4. An apparatus for laying a continuous elongate member as defined in claim 3 and further comprising:
 means positioned downstream of said welding means within said articulated train for heating the connection junctions of the tubular sections at the locations of welding to the continuous elongate member to relieve stresses at the junction location; and
 means positioned downstream of said heating means within said articulated train for inspecting the integrity of the weld junctions of the tubular sections connected into a continuous elongate member.

5. Apparatus for fabricating a continuous elongate tubular member and for laying said member upon a ground surface as defined in claim 4 and further comprising:
 means positioned within said articulated train downstream of said inspecting means for coating said continuous elongate member for protecting said member prior to disposing said member upon the underlying ground surface.

6. An apparatus for fabricating a continuous elongate tubular member and for laying said member upon a ground surface as defined in claim 1 wherein:
 said means for connecting comprises a connecting beam universally joined at each of the ends thereof between each of the adjacent longitudinally extending thermally insulated chambers; and
 said means for providing longitudinal communication comprises axially expandable-contractable tubular insulated wall means joined at each of the ends thereof between each of the adjacent longitudinally extending thermally insulated chambers.

7. An apparatus for fabricating a continuous elongate tubular member and for laying said member upon a ground surface as defined in claim 1 wherein said means for supporting said at least a portion of the continuous elongate member comprises:
 a plurality of normally extending roller supports positioned within said articulated train and operable to accommodate both lateral and vertical adjustment with respect to a central axis of said articulated train.

8. An apparatus for fabricating a continuous elongate tubular member and for laying said member upon a ground surface as defined in claim 7 and further comprises:
 means engaging the exterior surface of the continuous elongate member for imparting dynamic axial control within the continuous elongate member to control movement of the elongate member with respect to the articulated train.

9. An apparatus for fabricating a continuous elongate tubular member and for laying said member upon a ground surface as defined in claim 1 wherein said means for propelling said articulated train comprises:
 at least one self-propelled endless track unit positioned beneath and connected to each of said longitudinally extending thermally insulated chambers.

10. A method for fabricating a continuous elongate tubular member and laying the tubular member upon a ground surface comprising the steps of:
 providing a plurality of longitudinally extending thermally insulated longitudinal chambers connected end-to-end to form an enclosed articulated train with free axial communication between the thermally insulated chambers of the train, the train being suitable to extend along a ground surface and generally conform to the topography thereof;
 supplying tubular sections to the articulated train in a preheated condition relative to the ambient environment surrounding the exterior of the articulated train;
 maintaining a preselected temperature range within the interior of the articulated train;
 connecting the tubular sections to the free end of said elongate tubular member extending within the articulated train of insulated chambers; and
 advancing said articulated train from beneath the elongate tubular member to position said elongate tubular member upon the ground surface with a configuration of the elongate tubular member compatible with that of the topography of the underlying ground surface.

11. A method for fabricating a continuous elongate tubular member and laying the tubular member upon a ground surface as defined in claim 10 and further comprising the step of:
 shaping tubular sections in accordance with the topography of the ground surface adjacent the free end of the elongate tubular member extending within the enclosed articulated train of thermally insulated chambers.

12. A method for fabricating a continuous elongate tubular member and laying the tubular member upon a ground surface as defined in claim 11 wherein said step of connecting comprises:
 aligning the shaped tubular sections with the free end of the elongate tubular member, and
 welding the aligned tubular section to the free end of the elongate tubular member.

13. A method for fabricating a continuous elongate tubular member and laying the tubular member upon a ground surface as defined in claim 12 and further comprising the step of:
 heating the elongate tubular member within the enclosed articulated train to relieve stress at the weld junctions of the tubular sections connected to form the elongate tubular member; and
 inspecting within the enclosed articulated train the integrity of the weld connections between the shaped tubular sections and the free end of the elongate tubular member.

14. A method for fabricating a continuous elongate tubular member upon a ground surface as defined in claim 10 and further comprising the step of:
 controlling from within the articulated trains relative axial movement of the elongate member with respect to the articulated train.

15. A method for fabricating a pipeline and laying said pipeline onto an undulating ground surface comprising the steps of:
 providing a plurality of longitudinally extending thermally insulated chambers pivotally connected end-to-end for generally universal pivotal movement to form an enclosed articulated train with free axial communication between said chambers, the train being suitable to extend along and substantially conform to, the underlying undulating ground surface;
 maintaining a preselected temperature range within said articulated train;
 providing, in one of said chambers, pipe sections shaped in accordance with the undulating shape of the underlying ground surface on which said pipe sections are to be laid;
 passing said pipe sections sequentially rearwardly between said chambers;
 welding said pipe sections together in at least one of said chambers to form a pipeline;
 supporting said shaped pipe sections of said pipeline on vertically and laterally movable supports in said pipeline-carrying chambers so that said pipeline conforms substantially to the undulating shape of said ground surface and said articulated train;
 advancing said articulated train along said undulating ground surface so that said plurality of articulated chambers of said train pivot vertically relative to one another causing the train to continually assume a shape corresponding substantially to that of the undulating ground surface;
 during said advancement, causing said articulated train to advance along said ground surface relative to said pipeline so that one portion of said pipeline is discharged from a rear end of said train onto the ground surface, while another portion of said pipeline continues to be supported by pipeline-carrying chambers forming an undulating shape which conforms substantially to that of the pipeline and the ground surface; and
 adjusting said movable supports to maintain said pipeline oriented in a shape conforming substantially to the shape of the undulating ground surface on which it is to be laid.

16. A method according to claim 15 wherein said step of providing includes providing a plurality of pipe preparation chambers interconnected universally pivotally relative to one another, and a plurality of pipe joining chambers connected universally pivotally relative to one another and to said pipe preparation chambers, and wherein said method further includes the steps of storing, shaping, and beveling said pipe sections in said pipe preparation chambers, and passing said shaped and beveled pipe sections to said pipe joining chambers for welding.

\* \* \* \* \*